Sept. 9, 1969     H. E. RIORDAN ETAL     3,465,600
GYRO WITH PNEUMATIC PULSE DURATION MODULATION PICK-OFF
Filed Dec. 1, 1966     2 Sheets-Sheet 1
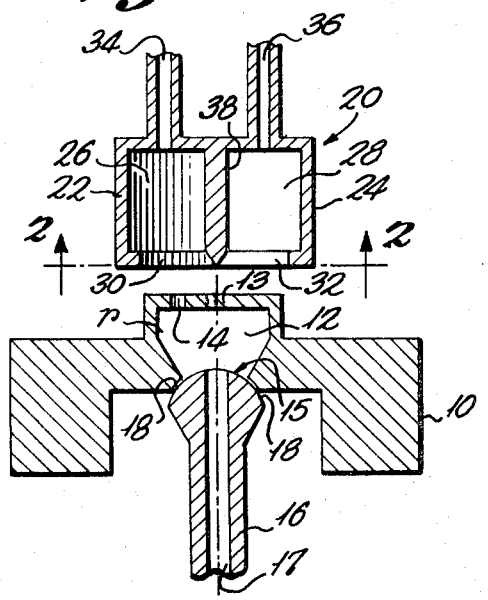
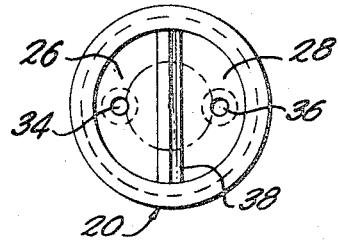
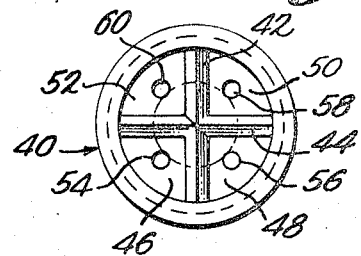
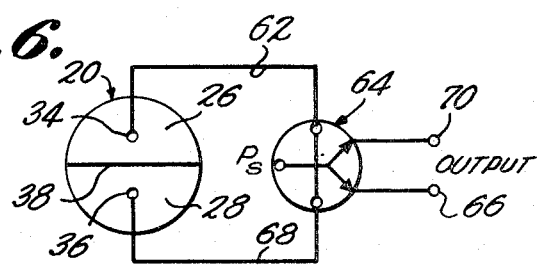
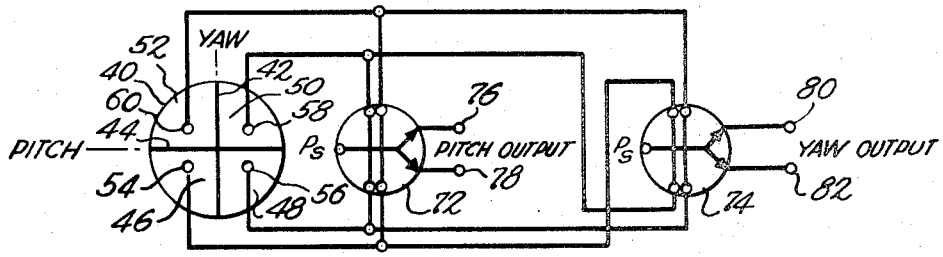
INVENTORS
HUGH E. RIORDAN,
CONSTANT JOHN De COTIIS &
HAROLD J. STRAUT
BY S. A. Giarratana +
K. A. Ohralik
ATTORNEYS Sept. 9, 1969     H. E. RIORDAN ETAL     3,465,600
GYRO WITH PNEUMATIC PULSE DURATION MODULATION PICK-OFF
Filed Dec. 1, 1966                                  2 Sheets-Sheet 2
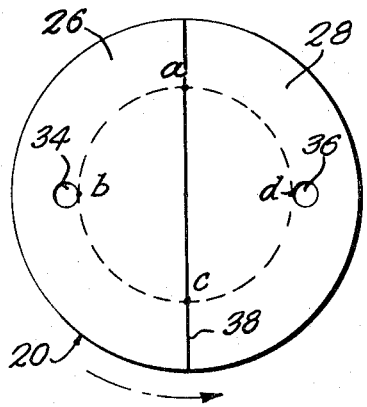
Fig. 4ª.
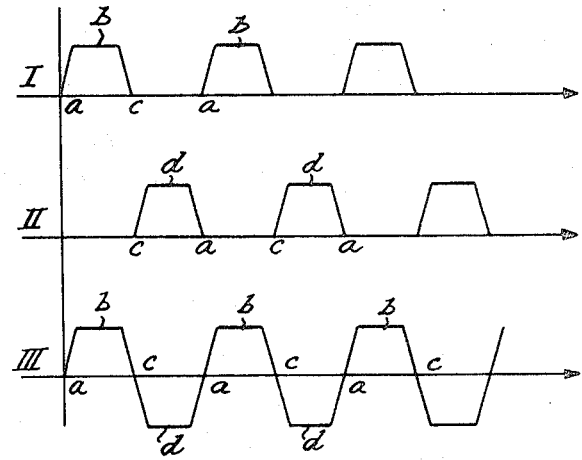
Fig. 4ᵇ.
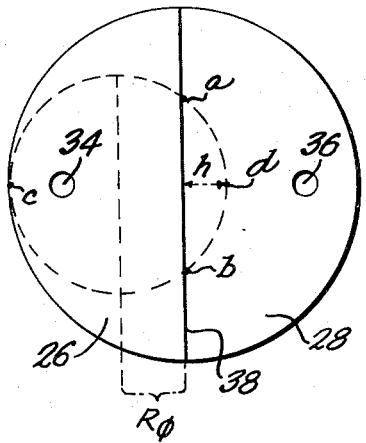
Fig. 5ª.
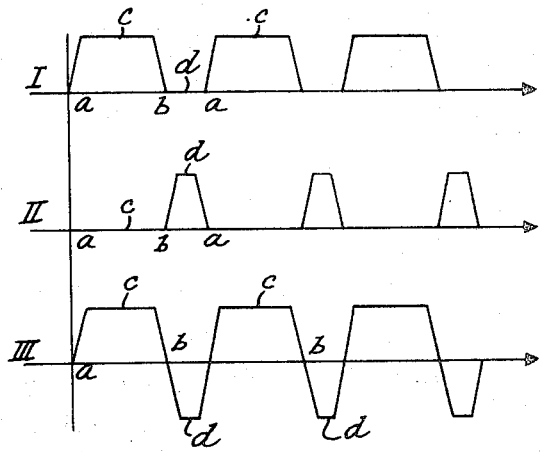
Fig. 5ᵇ.
INVENTORS
HUGH E. RIORDAN,
CONSTANT JOHN DECOTIIS &
HAROLD J. STRAUT
BY S. A. Giarratana &
K. A. Ohralik
ATTORNEYS

# United States Patent Office 3,465,600
Patented Sept. 9, 1969

3,465,600
GYRO WITH PNEUMATIC PULSE DURATION MODULATION PICK-OFF
Hugh E. Riordan, Wyckoff, Constant John de Cotiis, Cranford, and Harold J. Straut, Wayne, N.J., assignors to Singer-General Precision, Inc., Little Falls, N.J., a corporation of Delaware
Filed Dec. 1, 1966, Ser. No. 598,385
Int. Cl. G01c 19/28
U.S. Cl. 74—5.6   7 Claims

ABSTRACT OF THE DISCLOSURE

This patent specification discloses a gyro which directly produces a pneumatic pulse duration modulated output signal representing the tilt of the gyro about its input axis. The gyro contains a chamber with an orifice for forming a gas jet when the chamber is pressurized. The jet is parallel to the spin of the gyro and is displaced therefrom. The jet rotates with the gyro rotor and is directed into a plurality of receiving chambers which convert the jet to pressure pulses. When the gyro tilts the duration of the jet traverse over each receiving chamber is altered so that the pressure pulses have durations representing the tilt of the gyro roto. Pneumatic flip-flops are used to detect the output pulses from the receiving chambers.

---

This invention relates to pneumatic control systems, and more particularly, relates to a gyro which has a direct pulse duration modulated output signal.

It is known that the use of pulse duration modulation enables major simplifications to be made in pneumatic circuits in pneumatic control systems. For example, a pulse duration modulated signal may be amplified by non-linear bistable or switch-type amplifiers, and still carry the intelligence in linear analog form. Such switching amplifiers have the advantages of low cost and a superior signal-to-noise ratio and still provide a high gain per stage.

In pneumatic pulse duration modulation systems of the prior art involving gyros, the output signals of the gyros were in linear analog form and had to be converted to pulse duration modulation form. Circuits for making such a conversion had typically consisted of a fixed-frequency square wave multivibrator which was biased by the input signal to alter the dwell time at the end of the cycle, or a triangle wave generator, and summing and pulse-shaping circuits. Such circuits are quite complex and quite expensive, often containing as many as ten fluid amplifiers with their respective coupling and wave-shaping circuits. Regardless of their degree of sophistication, such circuits inevitably generate errors and noise.

It is accordingly an object of the present invention to provide a gyro which obviates the need for complex pneumatic circuits to convert the output of the gyro from linear analog form to pulse duration moduation form.

It is another object of the present invention to provide a gyro which delivers a pneumatic pulse duration modulated output signal substantially free of errors and noise.

It is a further object of the present invention to provide a gyro which delivers a pneumatic pulse duration modulated signal directly.

These and other objects of the present invention are realized by a gyro which comprises a rotor which is provided with a rotating gas jet which is displaced from the spin axis of the rotor. A receiver is generally aligned with the rotor so that the rotating gas jet delivers gas to compartments in the receiver, which convert the gas momentum of the jet to a static pressure in each of the compartments. As the rotor of the gyro is tilted, the arc which is cut by the gas jet in a particular chamber which is toward the angle of tilt of the vehicle is longer, and hence the pressure pulse in that particular chamber is of a greater duration. The duration of the pressure pulses in each of the compartments of the receiver represents the tilt angle of the rotor of the gyro.

The present invention can be more clearly understood by reference to the following description and drawings, wherein:

FIGURE 1 is a side view of the gyro assembly;
FIGURE 2 is a sectional view of a single axis receiver taken along the lines 2—2 of FIGURE 1;
FIGURE 3 is a sectional view of a two axis receiver taken along the lines 2—2 of FIGURE 1;
FIGURES 4a and 4b illustrate how the pressure waveforms at the receiver ports are produced when the spin axis of the rotor is aligned with the receiver;
FIGURES 5a and 5b illustrate how the pressure waveforms at receiver ports are produced when the spin axis of the rotor is displaced from the center of symmetry of the receiver.
FIGURE 6 is a schematic illustration of the receiver and pneumatic circuit for a single axis receiver; and,
FIGURE 7 is a schematic diagram of the receiver and the associated pneumatic circuits for a two axis receiver.

Referring initially to FIGURE 1, there is disclosed the gyro rotor 10, which is generally cup-shaped. For the sake of simplicity, the rotor bearings and support have been omitted from the drawing. At the center of the rotor, there is provided plenum chamber 12 which has an opening 15 at its lower end and is provided with means 14 for generating a gas jet. As shown in FIGURE 1 the means for generating the gas jet is simply an orifice in the top wall 13 of the plenum chamber, but, if desired, it may be a nozzle fixed on the top wall 13.

The rotor is disposed on conduit 16 which has a passage 17 therein to supply a gas to the plenum chamber 12 and means 14 for generating the gas jet. A gas seal is provided between the top of conduit 16 and the rotor 10 by coacting spherical surfaces 18 on both the rotor 10 and conduit 16 with a small clearance therebetween. The coacting spherical surfaces 18 permit the rotor 10 to tilt universally with respect to the conduit 16. The spherical surface 18 of the conduit 16 also serves to substantially close the opening 15 at the lower end of the plenum chamber 12.

The receiver section generally designated as 20 is in the form of a hollow cylinder, which is divided into at least two sections and as many as four sections. As shown in FIGURES 1 and 2 the receiver 20 is divided into two sections 22 and 24. The sections 22 and 24 have compartments or chambers 26 and 28, respectively, defined therein which compartments are provided with openings 30 and 32, respectively, which communicate with the rotating orifice 14. A divider 38 separates the chambers 26 and 28. The orifice 14, when it is in the proximity of the respective inlet openings, directs a gas jet into chambers 26 and 28 through inlet openings 30 and 32. The function of the chambers is to transform the momentum of the gas delivered to the chambers in the form of a gas jet to a static pressure, which appears at the respective outlet ports 34 and 36. The dotted line in FIGURE 2 represents the locus of the jet 14 as it rotates with the rotor about an axis which is aligned with the axis of the receiver 20.

FIGURE 3 illustrates an alternate receiver 40 which is divided into four sections, but is otherwise the same as receiver 20. As can be seen from this figure, there are provided chambers 46, 48, 50 and 52 which are separated from each other by dividers 42 and 44. The chambers are provided with outlet ports 54, 56, 58 and 60, respectively.

In operation, a gas is supplied to inlet 17 and conduit 16 to plenum chamber 12. The gas in plenum chamber 12 escapes through orifice 14 which generates the gas into a jet aligned with the spin axis of rotor 10 but displaced from the spin axis by the distance $r$. The locus of the jet impinging on the receiver as the rotor 10 spins is a circle which is designated by the dotted line in FIGURES 2 and 3. The radius of the circle is equal to the distance $r$. As the jet rotates with the rotor, gas is directed into chambers 26 and 28 of the single axis receiver 20. During the time in which the jet is directed into a given chamber of the receiver, this chamber of the receiver serves as a velocity diffuser, which converts the momentum of the gas in the jet into a static pressure. The static pressure appears at the exit port of the particular receiver into which the gas jet is directed. Thus, in FIGURE 2, with the direction of rotation of the gas jet being indicated by the arrow, as the gas jet is directed into chamber 26 of the single axis receiver, a gas pressure appears at exit port 34 of this receiver. Then, as the gas jet continues its course and passes over the divider 38, it is directed into chamber 28, and a static pressure appears at exit port 36. When the gas jet is directed to chamber 28, then chamber 26 and hence the corresponding outlet port 34 are at ambient pressures, and vice versa.

The two axis receiver 40 operates in a similar manner, except that there are four different chambers into which the jet is directed. Thus, for example, when the gas jet is directed into chamber 46, a static pressure will appear at exit port 54. As the rotor and gas jet continue to rotate in a counterclockwise direction as shown in FIGURE 3, the pressure at exit port 54 will return to ambient as the jet passes over the lower portion of divider 42 and injects gas to chamber 48. During the time in which the gas jet is directed into chamber 48, a static pressure will appear at outlet port 56. Similarly, as the gas jet passes the righthand side of divider 44, and gas is directed into chamber 50, a pressure pulse will appear at outlet port 58, at which time the pressure at outlet port 56 returns to ambient. As the jet intersects the upper portion of divider 42 and directs gas into chamber 52, a static pressure appears at outlet port 60 while the pressure at outlet port 58 returns to ambient.

FIGURE 4b illustrates the relation between pressure and time for each of the outlet ports 34 and 36 for a single axis receiver. The corresponding position of the gas jet is illustrated in FIGURE 4a. When the spin axis of the gyro rotor is aligned with the axis of the receiver 20, waveform I illustrates the variance of pressure with time for outlet port 34. The jet locus is indicated by the dotted line in FIGURE 4a and its direction of rotation is indicated by the arrow. When the jet is instantaneously located at point $a$ of its locus, the pressure at outlet port 34 begins to rise to a maximum of the pressure created by the gas jet. At point $b$, which represents one half of the time duration of the maximum of the pressure pulse, the gas jet is instantaneously located at point $b$ which is located at the half way point on the arc cut by the jet as it is directed to chamber 26 in FIGURE 4a. As the jet approaches point $c$, the pressure at outlet port 34 approaches ambient, which is shown as zero in FIGURE 4b. During the time in which the locus of the jet intersects chamber 28, the pressure at outlet port 34 remains substantially at ambient pressure. Then, as the jet approaches point $a$ again the cycle is repeated as the pressure at outlet port 34 increases.

The pressure at outlet port 36 is illustrated by the waveform II of FIGURE 4b. As the jet approaches point $c$, the static pressure at outlet port 36 begins to rise to a maximum. At point $d$ of graph II, the gas jet is instantaneously located at point $d$ of FIGURE 4a. Then, as the jet approaches point $a$, the static pressure at outlet port 36 decreases until it is zero and the jet reaches point $a$. Waveform III illustrates the difference between the pressure at port 34 and the pressure at port 36.

FIGURE 5a illustrates the locus of the rotating jet, and FIGURE 5b the resultant outlet port pressures as they vary with time when the rotor 10 is tilted at an angle $\phi$ from normal about a tilt axis parallel to the divider 38 and perpendicular to the axis of the rotor in its normal position. Considering first the pressure at outlet port 34 shown in waveform I, when the jet is located at point $a$, the pressure at outlet port 34 begins to rise and reaches a maximum. Point $c$ on waveform I illustrates the pressure at outlet port 34 when the jet is instantaneously located at point $c$ in FIGURE 5a. As the jet approaches point $b$, the pressure at outlet port 34 approaches ambient. The pressure at outlet port 34, while the jet is cutting the arc $adb$ remains substantially at ambient. However, when the jet returns to point $a$, the pressure again begins to rise as the jet cuts arc $acb$. Waveform II shows the variation of the pressure at outlet port 36 with time. When the jet is directed into chamber 26 and cutting arc $acb$, the pressure at outlet port 36 is substantially zero. When the jet reaches point $b$, the pressure at outlet port 36 begins to rise. Point $d$ on the waveform represents the position of the gas jet at point $d$ in FIGURE 5b. As the jet travels toward point $a$ along arc $adb$, the pressure again approaches zero at point $a$. Waveform III illustrates the difference between the pressure at port 34 and the pressure at port 36. As is evident from the above discussion, the tilt angle $\phi$ will determine the difference in the lengths of the arcs cut by the gas jet on either side of divider 38 of the receiver. Thus, the tilt angle $\phi$ is represented by the duration of the pressure pulses in each of the chambers of the receiver.

Assuming a constant angular velocity $\omega$ of the gyro rotor, the length of th earcs $adb$ and $acb$ determine the duration of the pulse on each side of the receiver divider 38 which is the zero reference. From this information, it can be derived that $$M = -\frac{2}{\pi} \arcsin\left(\frac{R\phi}{r}\right)$$

in which $r$ is the distance of the jet from the spin axis, R equals the distance from the rotor tilt axis to the entrance of the receiver, and $\phi$ is the rotor tilt angle and M is the modulation ratio defined as $$\frac{T_1 - T_2}{T_1 + T_2}$$

in which $T_1$ is the pulse duration at outlet port 34 and $T_2$ is the pulse duration at outlet port 36. Thus, from the above expression, the rotor tilt angle $\phi$ can be determined from the duration of the pressure pulses in the outlet ports.

FIGURE 6 illustrates schematically a device for detecting the output of the receiver 20. As can be seen in this figure, when the gas jet is directed into chamber 26, the static pressure pulse is transmitted to fluid or pneumatic flip-flop 64. The pneumatic flip-flop 64 is provided with a source of pressure generally designated as $P_s$. The static pressure developed in chamber 26 and transmitted to the flip-flop operates the flip-flop so that gas from pneumatic source of pressure $P_s$ is discharged through line 66. As the gas jet intersects divider 38 and is directed into chamber 28, the pressure developed therein and transmitted to flip-flop 64 causes flip-flop 64 to discharge gas from the pneumatic source of presure $P_s$ through line 70. Thus, substantially at all times there is a constant flow of gas from pneumatic source of pressure $P_s$ through one of the outlets 66 and 70, depending upon whether the gas jet is directed into chamber 26 or chamber 28, respectively.

FIGURE 7 illustrates the detection system for a two axis receiver for determining both the pitch and yaw of the vehicle carrying the instrument. In this device, the pressure impulses in chambers 50 and 52 are transmitted to one side of pneumatic bistable flip-flop 72 while the pressure impulses from chambers 46 and 48 are transmitted to the opposite side of pneumatic bistable flip-flop 72 to determine pitch about a tilt axis parallel to the divider 44. To determine the yaw about a tilt axis parallel to the divider 42, the pressure impulses from chambers 46 and 52 are fed to one side of pneumatic bistable element 74 while the pressure impulses from chambers 48 and 50 are fed to the opposite side of this flip-flop.

The flip-flop 72 will discharge gas from a source of pressure $P_s$ in an output line 76 if it receives a pressure pulse from either of the output ports 54 or 56 and will switch to discharge gas through an output line 78 when it receives pressure pulses from the outlet ports 58 and 60. Thus, while the jet is below the divider 44 as seen in FIGURE 7, the flip-flop 72 will discharge gas through line 76 and while the jet is above the divider 44, the flip-flop 72 will discharge gas through line 78. Thus, the ratio of the duration of gas discharge through the line 76 to that through the line 78 will represent the tilt of the gyro rotor about the tilt axis parallel to the divider 44 and accordingly will represent pitch. Similarly the flip-flop 74 will discharge gas through an output line 82 when it receives pressure pulses from outlet ports 54 and 60 and will switch to discharge gas through an outlet line 80 when it receives pressure pulses from outlet ports 56 and 58 Accordingly the flip-flop 74 will discharge gas through the outlet line 82 when the jet is on the left side of the divider 42 as seen in FIGURE 7 and will switch to discharge through the line 80 when the jet is on the right side of the divider 42. Thus, the ratio of the duration of gas discharge through line 80 to that through line 82 will represent the tilt of the gyro rotor about the tilt axis parallel to the divider 42 and will represent yaw. The pneumatic bistable element used in the system shown in FIGURES 6 and 7 are fully disclosed in Instruments and Control Systems, volume 34, pages 1260 and 1261.

What is claimed is:
1. A gyro assembly comprising a rotor, means to generate a gas jet to rotate with said rotor parallel to the spin axis of said rotor and displaced from the spin axis of said rotor, a receiver, said receiver being divided into a plurality of compartments, each of said compartments having an opening communicating with said jet, and an outlet, whereby the gas directed to each of said chambers is converted to a static pressure pulse as said jet rotates.

2. The assembly of claim 1 wherein said receiver is divided into two compartments.

3. The assembly of claim 1 wherein said receiver is divided into four compartments 4. A gyro assembly comprising a tiltable rotor including a chamber contained within said rotor and an orifice for forming a gas jet communicating with said chamber, said orifice being displaced radially from the spin axis of said rotor, means to supply gas to said chamber, a gas receiver, said receiver being divided into two compartments by a divider, said divider being substantially aligned with the normal spin axis of said rotor, each of said compartments having an opening therein communicating with said jet, and an outlet port, whereby the gas directed to each of said chambers is converted to a substantially static pressure pulse a said jet rotate with said rotor, and means for detecting the pressure pulse at each of said outlet ports.

5. The assembly of claim 4 wherein the means for detecting the pressure pulses includes a pneumatic bistable flip-flop having two inputs, each of said outlet ports of said compartments being connected to one input of said flip-flop.

6. A gyro assembly comprising a tiltable rotor including a chamber contained within said rotor and an orifice for forming a gas jet communicating with said chamber, said orifice being mounted on said rotor and being displaced radially from the spin axis of said rotor, means to supply gas to said chamber, a gas receiver, said gas receiver including a first compartment, a second compartment, a third compartment and a fourth compartment, each of said compartments having an opening therein communicating with said jet, and an outlet port, whereby gas directed to each of said chambers is converted to a substantially static pressure as said orifice rotates with said rotor, and means for detecting the pressure pulse at each of said outlet ports.

7. The assembly of claim 6 wherein the means for detecting the pressure pulses includes first and second pneumatic bistable flip-flop elements, and means connecting said outlet ports of said first and second compartments to one side of said first element and said outlet ports of said third and fourth compartments to the other side of said first element and connecting said outlet ports of said second and third compartments to one side of said second element and said outlet ports of said first and fourth compartments to the other side of said second element.

References Cited
UNITED STATES PATENTS

| | | | |
|---|---|---|---|
| 2,292,989 | 8/1942 | Carter | 74—5.43 |
| 3,165,282 | 1/1965 | Noyes | 74—5.6 XR |
| 3,311,987 | 4/1967 | Blazek | 74—5 XR |
| 3,340,740 | 9/1967 | Hall | 74—5.6 |

FRED C. MATTERN, Jr., Primary Examiner

M. ANTONAKAS, Assistant Examiner

U.S. Cl. X.R.

74—5.43